(12) United States Patent
Hatakeyama (10) Patent No.: US 10,001,823 B2
(45) Date of Patent: Jun. 19, 2018

(54) COMMUNICATION SYSTEM, COMMUNICATION DEVICE, AND ADDRESS SETTING METHOD (71) Applicant: Panasonic Intellectual Property Management Co., Ltd., Osaka (JP)

(72) Inventor: Takeshi Hatakeyama, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 300 days.

(21) Appl. No.: 14/794,895

(22) Filed: Jul. 9, 2015

(65) Prior Publication Data
US 2016/0018864 A1 Jan. 21, 2016

(30) Foreign Application Priority Data

Jul. 16, 2014 (JP) ................................ 2014-145527
May 26, 2015 (JP) ................................ 2015-105996

(51) Int. Cl.
*G06F 1/26* (2006.01)
*H04L 12/40* (2006.01)
*G06F 1/32* (2006.01)
*H04L 12/24* (2006.01)
*H04L 29/12* (2006.01)

(52) U.S. Cl.
CPC ............ *G06F 1/266* (2013.01); *G06F 1/3209* (2013.01); *H04L 12/40019* (2013.01); *H04L 12/40045* (2013.01); *H04L 41/044* (2013.01); *H04L 41/0809* (2013.01); *H04L 61/2038* (2013.01)

(58) Field of Classification Search
CPC ............ G06F 11/0754; G06F 13/4282; H04L 12/40019; H04L 12/40045
See application file for complete search history.

(56) References Cited

U.S. PATENT DOCUMENTS

| | | | | |
|---|---|---|---|---|
| 9,184,987 B2* | 11/2015 | Sequeira | ................. | H04L 12/12 |
| 2004/0111501 A1* | 6/2004 | Lee | ..................... | H04L 12/2803 709/222 |
| 2006/0161687 A1* | 7/2006 | Holt | ........................ | G06F 13/24 709/248 |
| 2007/0198748 A1* | 8/2007 | Ametsitsi | ............... | H04B 3/542 709/249 |

(Continued)

FOREIGN PATENT DOCUMENTS

| | | |
|---|---|---|
| JP | 09-501804 | 2/1997 |
| WO | 1995/001030 | 1/1995 |

*Primary Examiner* — Chirag R Patel
(74) *Attorney, Agent, or Firm* — Wenderoth, Lind & Ponack, L.L.P.

(57) ABSTRACT

The communication system includes a plurality of communication devices, and the communication devices form a hierarchical structure having two or more levels where an upper-level communication device is connected to one or more lower-level communication devices. In this communication system, a communication device connected to lower-level communication devices sequentially applies, to each of the connected lower-level communication devices, an operation of turning on one lower-level communication device and transmitting an address to the turned-on lower-level communication device. The address is set on the basis of the sequence of turning on the lower-level communication devices.

17 Claims, 5 Drawing Sheets

(56) References Cited

U.S. PATENT DOCUMENTS

2012/0221755 A1\* 8/2012 Schultz .............. G05B 19/4185
710/110
2013/0170336 A1\* 7/2013 Chen ....................... H04L 12/44
370/221

\* cited by examiner

COMMUNICATION SYSTEM, COMMUNICATION DEVICE, AND ADDRESS SETTING METHOD

BACKGROUND

1. Field of the Disclosure

The present disclosure relates to a communication system formed by hierarchically interconnecting a plurality of communication devices, a communication device included in the communication system, and an address setting method of the communication device.

2. Background Art

Unexamined Japanese Patent Publication No. H09-501804 (Patent Literature 1) discloses a communication system capable of automatically detecting the topology of a network. In this communication system, a search packet is transmitted from a master communication device to slave communication devices. The search packet is transmitted to all slave communication devices when each slave communication device serves as a relay station. Each slave communication device transmits own-device identification information to the master communication device. At this time, information of the relay station is stored in the search packet or a response packet to the search packet. Thus, the route from the master communication device to each slave communication device becomes apparent, and the network topology is automatically detected.

SUMMARY

The present disclosure provides a communication system, communication devices, and an address setting method capable of appropriately setting an address to each communication device even when the communication system is formed by hierarchically interconnecting the communication devices.

The communication system of the present disclosure includes a plurality of communication devices. The communication devices form a hierarchical structure having two or more levels where an upper-level communication device is connected to one or more lower-level communication devices. In this communication system, a communication device connected to lower-level communication devices sequentially applies, to each of the connected lower-level communication devices, an operation of turning on one lower-level communication device and transmitting an address to the turned-on lower-level communication device. The addresses are set based on the sequence of turning on the lower-level communication devices.

The communication device of the present disclosure includes one or more output power ports, and is configured to allow each of the output power ports to be connected to another communication device. The communication device whose output power ports are connected to lower-level communication devices sequentially applies, to each of the lower-level communication devices connected to the output power ports, an operation of turning on one lower-level communication device and transmitting an address to the turned-on lower-level communication device. The communication device sets the addresses based on the sequence of turning on the lower-level communication devices.

The address setting method of the present disclosure is an address setting method in a communication system including a plurality of communication devices. The communication devices form a hierarchical structure having two or more levels where an upper-level communication device is connected to one or more lower-level communication devices. In the address setting method, a communication device connected to the lower-level communication devices sequentially applies, to each of the connected lower-level communication devices, an operation of turning on one lower-level communication device and transmitting an address to the turned-on lower-level communication device. The addresses are set based on the sequence of turning on the lower-level communication devices.

The communication system of the present disclosure is useful for appropriately setting an address to each of the plurality of communication devices forming a hierarchical structure.

DETAILED DESCRIPTION

Hereinafter, the exemplary embodiments will be described in detail appropriately with reference to the accompanying drawings. Description more detailed than necessary is sometimes omitted. For example, a detailed description of a well-known item and a repeated description of substantially the same configuration are sometimes omitted. This is for the purpose of preventing the following descriptions from becoming more redundant than necessary and allowing persons skilled in the art to easily understand the exemplary embodiments.

The accompanying drawings and the following descriptions are provided to allow the persons skilled in the art to sufficiently understand the present disclosure. It is not intended that they restrict the main subject described within the scope of the claims.

In the following descriptions, the same symbols, codes, or numbers denote the same elements as long as there is no description. An element that is not essential to the present disclosure is not illustrated as long as there is no description.

First Exemplary Embodiment

The first exemplary embodiment is hereinafter described with reference to FIG. 1 to FIG. 5.

[1-1. Configuration]

In the present exemplary embodiment, an example that employs PLC (Power Line Communications) using a power line as a network communicating means is described. However, the communicating means is not limited to the PLC. Radio communication, or wire communication using a signal line dedicated to communication may be employed for the communicating means.

Figure 1:
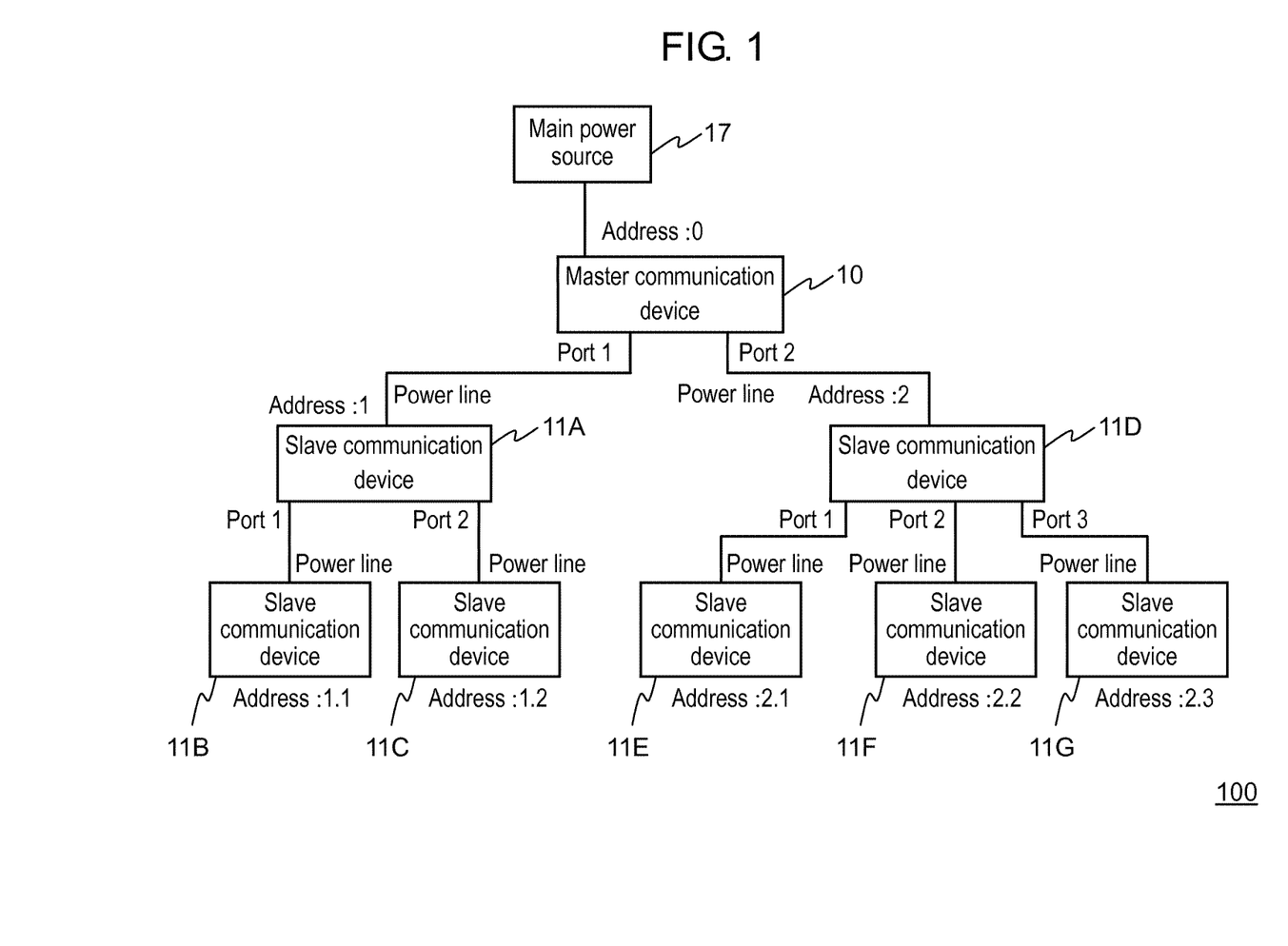
FIG. 1 is a diagram schematically showing one configuration example of a communication system in accordance with a first exemplary embodiment.

FIG. 1 is a diagram schematically showing one configuration example of communication system 100 in accordance with the first exemplary embodiment.

Communication system 100 includes master communication device 10 and a plurality of slave communication devices 11.

In the present exemplary embodiment, a configuration example is described where communication system 100 includes seven slave communication devices 11A to 11G. Slave communication devices 11A to 11G have substantially the same configuration. Therefore, as long as distinction is not especially required, each of slave communication devices 11A to 11G is simply referred to as "slave communication devices 11". Master communication device 10 and slave communication devices 11 are sometimes, collectively referred to as "communication devices".

In the configuration example of FIG. 1, communication system 100 has a hierarchical structure having three levels. The uppermost, first level has master communication device 10, the second level has slave communication devices 11A and 11D, and the lowermost, third level has slave communication devices 11B, 11C, and 11E to 11G. Slave communication devices 11A and 11D are connected to master communication device 10, slave communication devices 11B and 11C are connected to slave communication device 11A, and slave communication devices 11E to 11G are connected to slave communication device 11D.

In the example of FIG. 1, slave communication devices 11A and 11D are connected to master communication device 10. Therefore, master communication device 10 is an upper-level communication device with respect to slave communication devices 11A and 11D, and slave communication devices 11A and 11D are lower-level communication devices with respect to master communication device 10. Slave communication devices 11B and 11C are connected to slave communication device 11A, and slave communication devices 11E to 11G are connected to slave communication device 11D. Therefore, slave communication device 11A is an upper-level communication device with respect to slave communication devices 11B and 11C, and slave communication device 11D is an upper-level communication device with respect to slave communication devices 11E to 11G.

Thus, in the present exemplary embodiment, "upper level" and "lower level" of "upper-level communication device" and "lower-level communication device" are relative, and not absolute. In the example of FIG. 1, slave communication devices 11B and 11C are lower-level communication devices with respect to slave communication device 11A. When lower-level communication device 11 is connected to slave communication device 11B, however, slave communication device 11B is an upper-level communication device with respect to lower-level slave communication device 11.

In the present exemplary embodiment, an uppermost-level communication device in the hierarchical structure is referred to as "master communication device 10" in order to discriminate the uppermost-level communication device from the other communication devices. Master communication device 10 may be substantially the same as slave communication device 11. Alternatively, master communication device 10 may have a configuration different from that of slave communication device 11,—for example, master communication device 10 has a server function.

Figure 2:
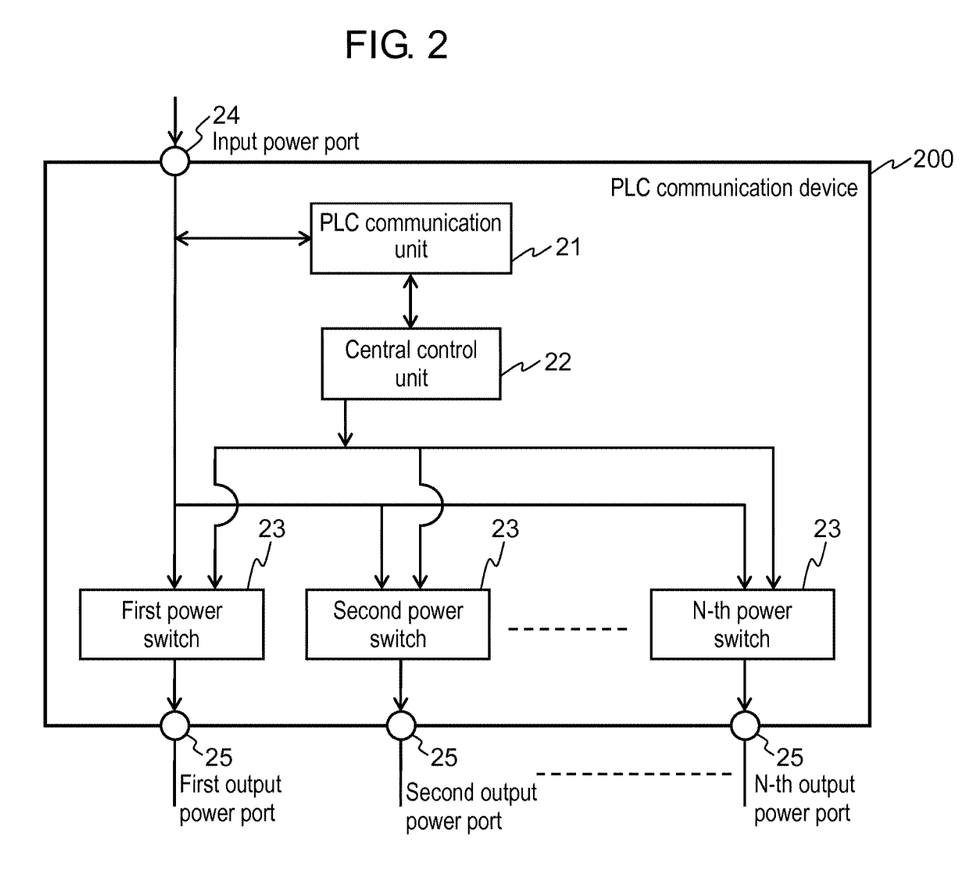
FIG. 2 is a block diagram schematically showing one example of the internal configuration of a PLC (Power Line Communications) communication device in accordance with the first exemplary embodiment.

FIG. 2 is a block diagram schematically showing one example of the internal configuration of PLC communication device 200 in accordance with the first exemplary embodiment.

Both of master communication device 10 and slave communication device 11 have PLC communication device 200 shown in FIG. 2. Therefore, data transmission/reception between master communication device 10 and slave communication device 11, and data transmission/reception between slave communication devices 11 can be performed by PLC using a power line.

Master communication device 10 may include a device (not shown) serving as a server, for example. Slave communication device 11 may include a display and a device serving as a terminal, for example.

PLC communication device 200 includes input power port 24, PLC communication unit 21, central control unit 22, a plurality of power switches 23, and a plurality of output power ports 25.

Input power port 24 is connected to each of the plurality of power switches 23, and each output power port 25 is connected to each power switch 23.

One output power port 25 corresponds to one power switch 23. FIG. 2 shows an example where PLC communication device 200 includes N power switches 23 (first power switch to N-th power switch in FIG. 2), and N output power ports 25 (first output power port to N-th output power port in FIG. 2). As shown in FIG. 2, first power switch 23 corresponds to first output power port 25, second power switch 23 corresponds to second output power port 25, and N-th power switch 23 corresponds to N-th output power port 25. Here, N is an integer of 1 or more.

FIG. 1 shows an example where each of master communication device 10 and slave communication device 11A includes two output power ports 25 and slave communication device 11D includes three output power ports 25. In FIG. 1, first output power port 25 is denoted with "port 1", second output power port 25 is denoted with "port 2", third output power port 25 is denoted with "port 3", and N-th output power port 25 is denoted with "port N". However, the number of output power ports 25 included in each of master communication device 10 and slave communication device 11 is not limited to the above-mentioned numerical value.

Each power switch 23 outputs, through each output power port 25, to the outside, electric power that is based on the electric power input from input power port 24. In other words, power switch 23 is disposed between input power port 24 and output power port 25, and controls the electric power supply to the outside through output power port 25.

Output power port 25 can be connected to input power port 24 of another PLC communication device 200 via a power line. In other words, input power port 24 can be connected to output power port 25 of another PLC communication device 200 via a power line.

When power switch 23 is turned on, electric power based on the electric power input from input power port 24 is supplied to another PLC communication device 200 connected to its own output power port 25. Power switch 23 is controlled by central control unit 22.

In communication system 100 of the present exemplary embodiment, input power port 24 included in slave communication device 11 is connected, via a power line, to output power port 25 of another slave communication device 11 or output power port 25 included in master communication device 10. Therefore, in communication system 100, slave communication device 11 or master communication device 10 that is connected to its own input power port 24 is an upper-level communication device, and slave communication device 11 connected to its own output power port 25 is a lower-level communication device. To each slave communication device 11, electric power is supplied through input power port 24 from PLC communication device 200 included in another slave communication device 11 or master communication device 10. By the supply of the electric power, slave communication device 11 is turned on.

In the example shown in FIG. 1, first output power port 25 (port 1) of master communication device 10 is connected via a power line to input power port 24 of slave communication device 11A, and second output power port 25 (port 2) is connected via a power line to input power port 24 of slave communication device 11D. Therefore, master communication device 10 can supply electric power to slave communication devices 11A and 11D, and can turn on slave communication devices 11A and 11D.

In the example shown in FIG. 1, first output power port 25 (port 1) of slave communication devices 11A is connected via a power line to input power port 24 of slave communication device 11B, and second output power port 25 (port 2) is connected via a power line to input power port 24 of slave communication device 11C. Therefore, slave communication device 11A can supply electric power to slave communication devices 11B and 11C, and can turn on slave communication devices 11B and 11C.

Furthermore, in the example shown in FIG. 1, first output power port 25 (port 1) of slave communication devices 11D is connected via a power line to input power port 24 of slave communication device 11E, second output power port 25 (port 2) is connected via a power line to input power port 24 of slave communication device 11F, and third output power port 25 (port 3) is connected via a power line to input power port 24 of slave communication device 11G. Therefore, slave communication devices 11D can supply electric power to slave communication devices 11E to 11G, and can turn on slave communication devices 11E to 11G.

In communication system 100 of the present exemplary embodiment, thus, an upper-level communication device (slave communication device 11 or master communication device 10) can supply electric power to lower-level slave communication device 11 and can turn on lower-level slave communication device 11.

Preferably, input power port 24 of master communication device 10 is connected to main power source 17 that can supply the electric power used by master communication device 10 and slave communication devices 11, as shown in FIG. 1.

Central control unit 22 controls whole PLC communication device 200.

PLC communication unit 21 included in PLC communication device 200 performs PLC via a power line. In other words, PLC communication unit 21 performs, by PLC, data transmission/reception between master communication device 10 and slave communication device 11, and data transmission/reception between slave communication devices 11. The PLC performed by PLC communication unit 21 is substantially the same as the generally known PLC, so that the detailed description is omitted.

[1-2. Operation]

Next, the operation of communication system 100 of the present exemplary embodiment is described with reference to FIG. 3 to FIG. 5.

Figure 3:
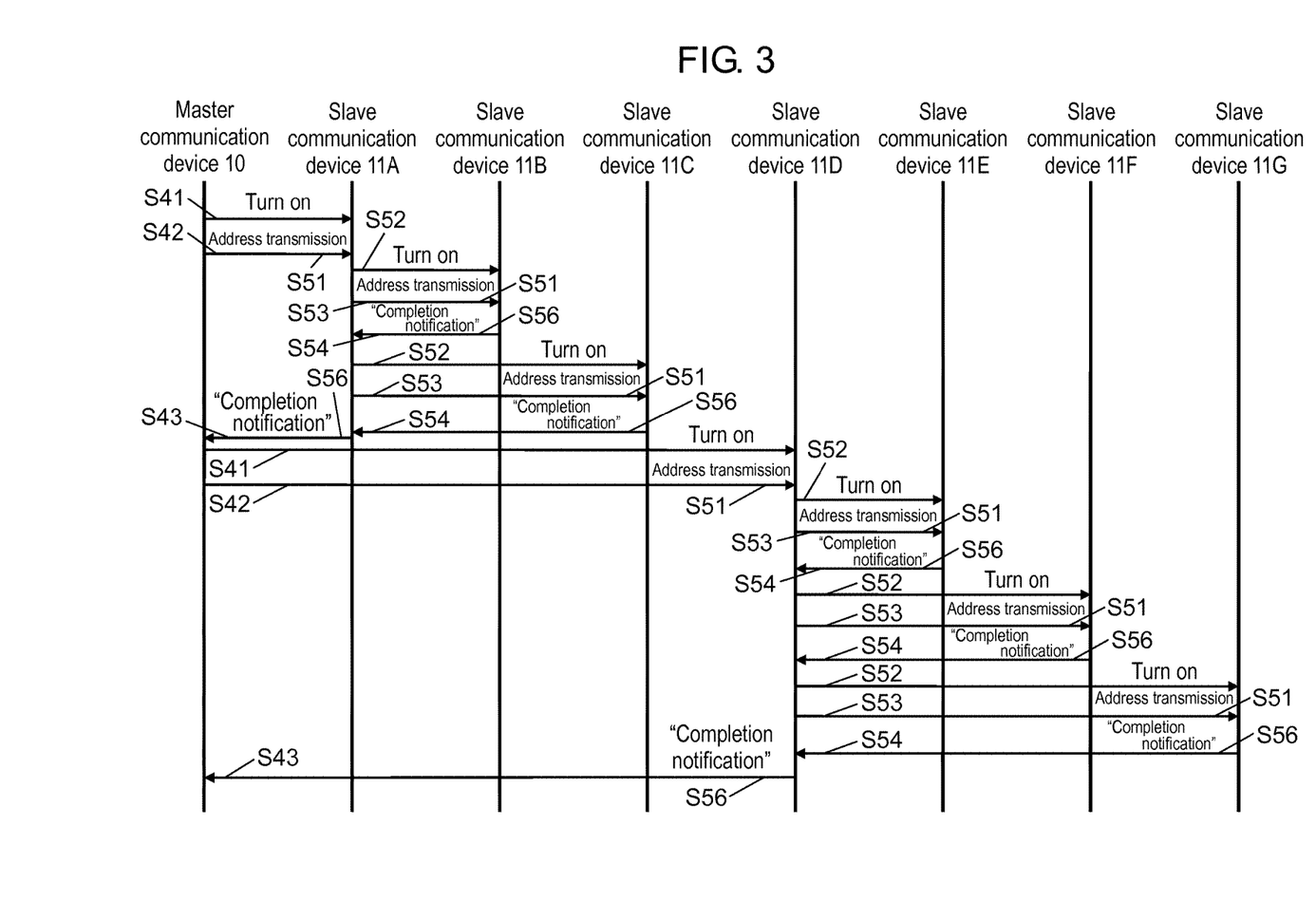
FIG. 3 is a sequence diagram schematically showing one operation example of the communication system in accordance with the first exemplary embodiment.

FIG. 3 is a sequence diagram schematically showing one operation example of communication system 100 in accordance with the first exemplary embodiment. FIG. 3 shows a sequence diagram based on the configuration of communication system 100 shown in FIG. 1.

Figure 4:
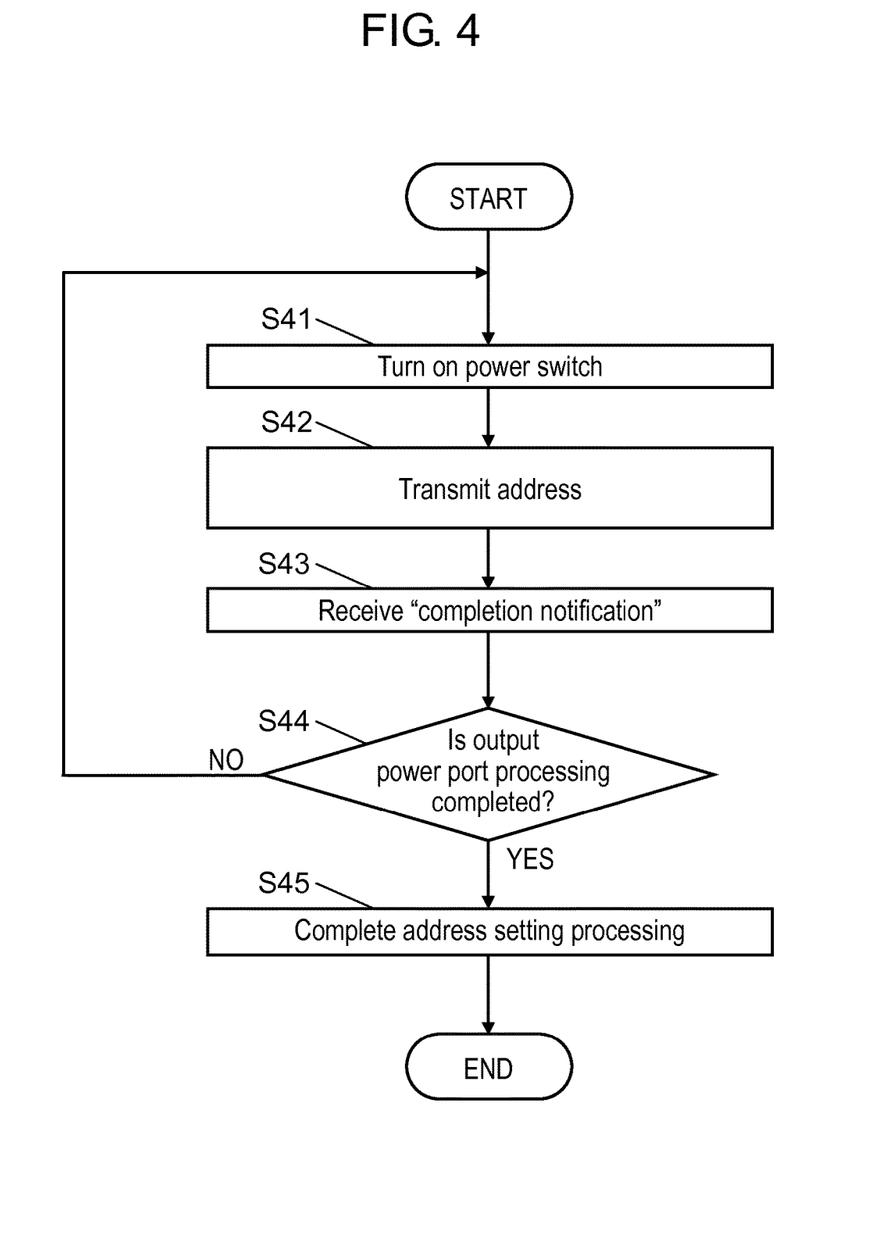
FIG. 4 is a flowchart schematically showing one operation example of a master communication device in accordance with the first exemplary embodiment.

FIG. 4 is a flowchart schematically showing one operation example of master communication device 10 in accordance with the first exemplary embodiment.

Figure 5:
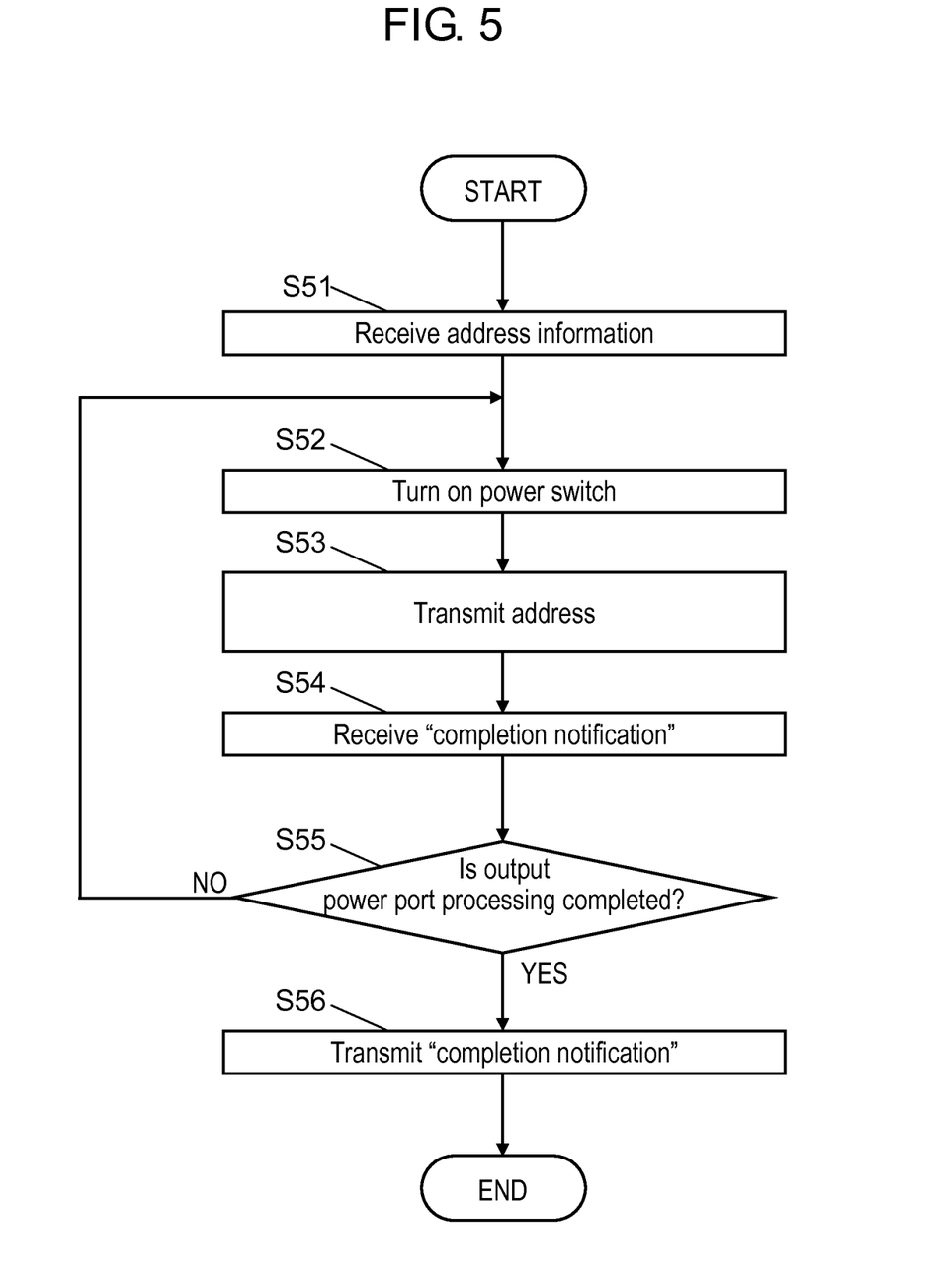
FIG. 5 is a flowchart schematically showing one operation example of a slave communication device in accordance with the first exemplary embodiment.

FIG. 5 is a flowchart schematically showing one operation example of slave communication device 11 in accordance with the first exemplary embodiment.

In communication system 100 of the present exemplary embodiment, when master communication device 10 is turned on, slave communication devices 11 are sequentially turned on ("TURN ON" in FIG. 3), and addresses in a power line network are sequentially set to slave communication devices 11. In the present exemplary embodiment, even when communication devices communicate with each other by PLC, the upper-level communication device can identify the lower-level communication devices and can appropriately set addresses to the lower-level communication devices. That is because the upper-level communication device sequentially turns on the lower-level communication devices. Hereinafter, on the basis of the sequence diagram of FIG. 3, using the flowcharts of FIG. 4 and FIG. 5, a series of operations of sequentially setting addresses to slave communication devices 11 are described.

When master communication device 10 is turned on, central control unit 22 of master communication device 10 turns on one power switch 23 to start the electric power supply through one output power port 25 connected to turned-on power switch 23. Thus, master communication device 10 turns on one slave communication device 11 connected to this output power port 25 (step S41).

FIG. 3 shows the operation example where master communication device 10 performs the electric power supply in numerical sequence of output power ports 25. Therefore, in step S41 above, central control unit 22 of master communication device 10 firstly turns on first power switch 23, and outputs electric power through first output power port 25 (port 1 in FIG. 1). In the example of FIG. 1, slave communication device 11A is connected to first output power port 25 (port 1) of master communication device 10. Therefore, in this step S41, slave communication device 11A is turned on.

At this time, second power switch 23 of master communication device 10 is in the OFF state, and hence electric power is not output through second output power port 25 (port 2 in FIG. 1) of master communication device 10. Therefore, slave communication device 11D connected to second output power port 25 (port 2) of master communication device 10 is not operating.

Next, master communication device 10 determines, in accordance with a predetermined procedure, an address in the power line network of slave communication device 11 turned on in step S41. Master communication device 10 notifies slave communication device 11 of the determined address. This notification is performed by PLC communication unit 21 of master communication device 10 by the PLC using the power line that connects master communication device 10 to slave communication device 11 turned on in step S41 (step S42).

At this time, master communication device 10 determines addresses of lower-level slave communication devices 11 connected to master communication device 10 on the basis of the sequence of turning on them. For example, when master communication device 10 performs the electric power supply in numerical sequence of output power ports 25, master communication device 10 may determine the addresses on the basis of the serial numbers of output power ports 25.

In the example of FIG. 3, in this step S42, on the basis of the serial numbers of output power ports 25, master communication device 10 determines the address in the power line network of slave communication device 11A turned on in step S41. The electric power supply through first output power port 25 is started in step S41 above, so that master communication device 10 sets "1", for example, as the address of slave communication device 11A. Then, master communication device 10 notifies slave communication device 11A of address "1" by the PLC using the power line that connects master communication device 10 to slave communication device 11A.

Slave communication device 11 turned on by the electric power supplied from master communication device 10 receives, through input power port 24, address information transmitted via the power line from master communication device 10. This reception of the address information is performed by PLC communication unit 21 of this slave communication device 11. Then, this slave communication device 11 stores, in a memory (not shown), the received address information as its own address in the power line network (step S51).

In the example of FIG. 3, this step S51 is executed in slave communication device 11A. Therefore, slave communication device 11A receives, through its own input power port 24, the address information (e.g. address "1") transmitted from master communication device 10 via the power line, and stores the address information in its own memory.

At this time, slave communication device 11D is not operating, so that the address information to be received by slave communication device 11A is not accidentally received by slave communication device 11D.

Next, central control unit 22 of this slave communication device 11 turns on one power switch 23, supplies electric power to one lower-level slave communication device 11 connected to this slave communication device 11, and turns on this lower-level slave communication device 11 (step S52).

In the example of FIG. 3, this step S52 is executed in slave communication device 11A. FIG. 3 shows the operation example where slave communication device 11 performs the electric power supply in numerical sequence of output power ports 25. Therefore, in step S52 above, central control unit 22 of slave communication device 11A firstly turns on first power switch 23, and outputs electric power through first output power port 25 (port 1 in FIG. 1). In the example of FIG. 1, slave communication device 11B is connected to first output power port 25 (port 1) of slave communication device 11A. Therefore, in this step S52, slave communication device 11B is turned on.

At this time, second power switch 23 of slave communication device 11A is in the OFF state, and hence electric power is not output through second output power port 25 (port 2 in FIG. 1) of slave communication device 11A. Therefore, slave communication device 11C connected to second output power port 25 (port 2) of slave communication device 11A is not operating.

Next, slave communication device 11 turned on in step S41 determines, in accordance with the predetermined procedure, an address in the power line network of lower-level slave communication device 11 turned on in step S52. Then, slave communication device 11 turned on in step S41 notifies lower-level slave communication device 11 turned on in step S52 of the determined address (step S53).

In the present exemplary embodiment, slave communication device 11 determines addresses of lower-level slave communication devices 11 on the basis of the sequence of turning on them. For example, when slave communication device 11 performs the electric power supply in numerical sequence of output power ports 25, slave communication device 11 may determine the addresses on the basis of the serial numbers of output power ports 25.

In the example of FIG. 3, this step S53 is executed in slave communication device 11A. In this step S53, slave communication device 11A, on the basis of its own address and the serial number of output power port 25, determines an address in the power line network of slave communication device 11B that is turned on in step S52. In the above-mentioned example, the address of slave communication device 11A is "1", and the electric power supply through first output power port 25 is started in step S52 above. Therefore, slave communication device 11A sets "1.1" as the address of slave communication device 11B, for example. Then, PLC communication unit 21 of slave communication device 11A notifies slave communication device 11B of address "1.1" by the PLC using the power line that connects slave communication device 11A to slave communication device 11B.

Slave communication device 11 turned on by the electric power supplied from upper-level slave communication device 11 receives, through input power port 24, address information (address transmitted in step S53) transmitted via the power line from upper-level slave communication device 11. This reception of the address information is performed by PLC communication unit 21 of this slave communication device 11. Then, this slave communication device 11 stores, in the memory (not shown), the received address information as its own address in the power line network (step S51).

Therefore, step S51 in lower-level slave communication device 11 corresponds to step S53 in upper-level slave communication device 11. In the example of FIG. 3, step S51 in slave communication device 11B corresponds to step S53 in slave communication device 11A.

In the example of FIG. 3, this step S51 is executed in slave communication device 11B. Therefore, slave communication device 11B receives, through its own input power port 24, the address information (e.g. address "1.1") transmitted from slave communication device 11A via the power line, and stores the address information in its own memory.

At this time, slave communication device 11C is not operating, so that the address information to be received by slave communication device 11B is not accidentally received by slave communication device 11C.

Here, slave communication device 11 disposed at the lowermost level in the hierarchical structure, namely slave communication device 11 that is not connected to lower-level slave communication device 11, may execute step S56 after step S51, without executing steps S52 to S55.

In the example of FIG. 1, slave communication device 11B is slave communication device 11 disposed at the lowermost level in the hierarchical structure, and is not connected to lower-level slave communication device 11. Therefore, slave communication device 11B may execute step S56 after step S51, without executing steps S52 to S55.

In step S56, slave communication device 11 transmits information (hereinafter referred to as "completion notification") showing the completion of processing to the upper-level communication device (master communication device 10 or upper-level slave communication device 11) that supplies electric power to its own input power port 24 (step S56).

This transmission of "completion notification" is performed by the PLC using the power line that connects this slave communication device 11 to the upper-level communication device. After the processing in step S56 is executed, the address setting processing at this slave communication device 11 is completed.

In the example of FIG. 3, this step S56 is executed in slave communication device 11B. Slave communication device 11B transmits "completion notification" to slave communication device 11A, which is the upper-level communication device that supplies electric power to slave communication device 11B. Thus, address setting processing to slave communication device 11B is completed.

Determination whether slave communication device 11 is connected to lower-level slave communication device 11 can be achieved by the processes of, for example:
  disposing, in each output power port 25, a switch for setting each output power port 25 valid (connected to lower-level slave communication device 11) or invalid (not connected to lower-level slave communication device 11);
  previously setting the switch valid or invalid; and
  making the setting identifiable by central control unit 22.

In this configuration, when all of the switches disposed in each of output power ports 25 are set invalid, central control unit 22 of slave communication device 11 recognizes that no lower-level slave communication device 11 is connected to its own output power ports 25. Therefore, after receiving the address information from the upper-level communication device, this slave communication device 11 can transmit "completion notification" to the upper-level communication device without executing steps S52 to S54. In the example of FIG. 1, this configuration is applicable to slave communication devices 11B, 11C, 11E, 11F, and 11G disposed at the lowermost level in the hierarchical structure.

This configuration is also effective for determination in step S55 in slave communication device 11 and determination in step S44 in master communication device 10. In these steps, it is determined whether slave communication device 11 (or master communication device 10) has executed the operation of turning on all of lower-level slave communication devices 11 connected to its own output power ports 25 and transmitting addresses to them (whether the processing related to its own output power ports 25 is completed). Therefore, when each of slave communication device 11 and master communication device 10 includes this configuration, it can easily recognize which output power port 25 is valid and how many slave communication devices 11 are connected to it.

The present exemplary embodiment is not limited to this configuration. For example, even in slave communication device 11 that is disposed at the lowermost level in the hierarchical structure and is not connected to lower-level slave communication device 11, steps S52 to S54 may be executed after the address information is received from the upper-level communication device. In this case, for example, when slave communication device 11 cannot receive "completion notification" even after a predetermined period, slave communication device 11 may determine that no lower-level slave communication devices 11 is connected to its own output power ports 25, and may transmit "completion notification" to the upper-level communication device.

Upper-level communication device 11 receives "completion notification" transmitted from lower-level slave communication device 11 (step S54).

Therefore, step S56 in lower-level slave communication device 11 corresponds to step S54 in upper-level slave communication device 11. In the example of FIG. 3, step S56 in slave communication device 11B corresponds to step S54 in slave communication device 11A.

Slave communication device 11 having received "completion notification" from lower-level slave communication device 11 determines whether the processing related to its own output power ports 25 is completed (whether the operation of turning on all of lower-level slave communication devices 11 connected to its own output power ports 25 and transmitting addresses to them is completed) (step S55).

When it is determined in step S55 that processing related to its own output power ports 25 is completed (Yes), slave communication device 11 transmits information ("completion notification") showing the completion of the address setting processing to the upper-level communication device (master communication device 10 or upper-level slave communication device 11) that supplies electric power to its own input power port 24 (step S56).

When it is determined in step S55 that the processing related to its own output power ports 25 is not completed (No), slave communication device 11 returns to step S52, and repeats a series of processing steps (steps S52 to S55).

In the example of FIG. 3, this step S55 is executed in slave communication device 11A. At this time, address transmission from slave communication device 11A to slave communication device 11C has not been performed. Therefore, slave communication device 11A determines in this step S55 that the processing related to its own output power ports 25 is not completed (No). Then, slave communication device 11A returns to step S52, and repeats the series of processing steps (steps S52 to S55 in slave communication device 11A).

In the example of FIG. 3, central control unit 22 of slave communication device 11A turns on second power switch 23 that has been in the OFF state, and starts to output electric power through second output power port 25 (port 2 in FIG. 1). In the example of FIG. 1, slave communication device 11C is connected to second output power port 25 (port 2) of slave communication device 11A. Therefore, slave communication device 11C is turned on (step S52 in slave communication device 11A). At this time, central control unit 22 of slave communication device 11A may keep, in the ON state, first power switch 23 that has been in the ON state, or may temporarily turn off first power switch 23 to temporarily stop the electric power supply through first output power port 25 (port 1 in FIG. 1) (not shown).

Next, slave communication device 11A determines an address of slave communication device 11C in the power line network. In the above-mentioned example, the address of slave communication device 11A is "1", and, in immediately preceding step S52, the electric power supply through second output power port 25 is started. Therefore, slave communication device 11A sets "1.2", for example, as the address of slave communication device 11C. Then, PLC communication unit 21 of slave communication device 11A notifies slave communication device 11C of address "1.2" by the PLC using the power line that connects slave communication device 11A to slave communication device 11C (step S53 in slave communication device 11A).

Slave communication device 11C that is turned on by the electric power supplied from upper-level slave communication device 11A executes steps S51 to S56, similarly to above-mentioned slave communication device 11B. In other words, slave communication device 11C receives, through its own input power port 24, address information (e.g. address "1.2") transmitted via the power line from upper-level slave communication device 11A, and stores it in its own memory (step S51 in slave communication device 11C).

At this time, slave communication device 11B has already received address information and has stored it in its own memory. Therefore, the address information to be received by slave communication device 11C is not accidentally received by slave communication device 11B.

In the example of FIG. 1, slave communication device 11C disposed at the lowermost level in the hierarchical structure is not connected to lower-level slave communication device 11. Therefore, slave communication device 11C may execute step S56 after step S51, without executing steps S52 to S55.

Slave communication device 11C executes step S56, and transmits "completion notification" to slave communication device 11A, which is the upper-level communication device that supplies electric power to slave communication device 11C (step S56 in slave communication device 11C). Thus, the address setting processing to slave communication device 11C is completed.

When slave communication device 11A receives "completion notification" transmitted from slave communication device 11C (step S54 in slave communication device 11A), slave communication device 11A determines whether the processing related to its own output power ports 25 is completed (step S55 in slave communication device 11A).

In the example of FIG. 1, lower-level slave communication devices 11 connected to slave communication device 11A are slave communication devices 11B and 11C. Therefore, in this step S55, slave communication device 11A determines that the processing related to its own output power ports 25 is completed (Yes). Then, slave communication device 11A transmits "completion notification" to master communication device 10, which is the upper-level communication device that supplies electric power to slave communication device 11A (step S56 in slave communication device 11A). This transmission of "completion notification" is performed by PLC communication unit 21 of slave communication device 11A by the PLC using the power line that connects slave communication device 11A to master communication device 10. After the processing in step S56 is executed, the address setting processing at slave communication device 11A is completed.

Master communication device 10 receives "completion notification" transmitted from lower-level slave communication device 11 (step S43).

Therefore, step S56 in lower-level slave communication device 11 corresponds to step S43 in master communication device 10. In the example of FIG. 3, step S56 in slave communication device 11A corresponds to step S43 in master communication device 10.

Master communication device 10 having received "completion notification" from lower-level slave communication device 11 determines whether the processing related to its own output power ports 25 is completed (whether the operation of turning on all of lower-level slave communication devices 11 connected to its own output power ports 25 and transmitting addresses to them is completed) (step S44).

When it is determined in step S44 that the processing related to its own output power ports 25 is not completed (No), master communication device 10 returns to step S41, and repeats a series of processing steps (steps S41 to S44).

In the example of FIG. 3, at this time, address transmission from master communication device 10 to slave communication device 11D has not been performed. Therefore, master communication device 10 determines, in this step S44, that the processing related to its own output power ports 25 is not completed (No). Then, master communication device 10 returns to step S41, and repeats the series of processing steps (steps S41 to S44).

In the example of FIG. 3, central control unit 22 of master communication device 10 turns on second power switch 23 that has been in the OFF state, and starts to output electric power through second output power port 25 (port 2 in FIG. 1). In the example of FIG. 1, slave communication device 11D is connected to second output power port 25 (port 2) of master communication device 10. Therefore, slave communication device 11D is turned on (step S41). At this time, central control unit 22 of master communication device 10 may keep, in the ON state, first power switch 23 that has been in the ON state, or may temporarily turn off first power switch 23 to temporarily stop the electric power supply through first output power port 25 (port 1 in FIG. 1) (not shown).

Next, master communication device 10 determines an address of slave communication device 11D in the power line network, and notifies slave communication device 11D of the address (step S42). In the above-mentioned example, in immediately preceding step S41, the electric power supply through second output power port 25 is started. Therefore, master communication device 10 sets "2", for example, as the address of slave communication device 11D. Then, PLC communication unit 21 of master communication device 10 notifies slave communication device 11D of address "2" by the PLC using the power line that connects master communication device 10 to slave communication device 11D.

At this time, slave communication device 11A has already received address information and has stored it in its own memory. Therefore, the address information to be received by slave communication device 11D is not accidentally received by slave communication device 11A.

The following operations are substantially the same:
the operation of slave communication device 11D after it is turned on by the electric power supplied from master communication device 10 and receives address information from master communication device 10: and
the above-mentioned operation of slave communication device 11A after it is turned on by the electric power supplied from master communication device 10 and receives address information from master communication device 10.

The operations of slave communication devices 11E to 11G connected to slave communication device 11D (namely, lower-level slave communication devices 11 with respect to slave communication device 11D) are substantially the same as the above-mentioned operations of slave communication devices 11B and 11C connected to slave communication device 11A.

In other words, slave communication device 11D repeats steps S52 to S55 similarly to slave communication device 11A (discussed above). During this operation, slave communication devices 11E to 11G execute steps S51 and S56 similarly to slave communication devices 11B and 11C (discussed above).

The descriptions of these operations are omitted because they have been described.

Thus, an address in the power line network is set to each of slave communication devices 11E to 11G. In the example of FIG. 1, address "2.1" is set to slave communication device 11E, address "2.2" is set to slave communication device 11F, and address "2.3" is set to slave communication device 11G. Thus, the address setting processing to slave communication devices 11E to 11G is completed.

After completing the address setting to slave communication devices 11E to 11G, receiving "completion notification" from each of slave communication devices 11E to 11G, and determining "Yes" in step S55, slave communication device 11D executes step S56 and transmits "completion notification" to master communication device 10. This transmission of "completion notification" is performed via the power line that connects master communication device 10 to slave communication device 11D. Thus, the address setting processing at slave communication device 11D is completed.

Master communication device 10 receives "completion notification" transmitted from lower-level slave communication device 11D (step S43). Therefore, step S56 in slave communication device 11D corresponds to step S43 in master communication device 10.

After receiving "completion notification" from slave communication device 11D, master communication device 10 determines whether the processing related to its own output power ports 25 is completed (step S44).

In the example of FIG. 1, lower-level slave communication devices 11 connected to master communication device 10 are slave communication devices 11A and 11D. Therefore, in step S44, master communication device 10 determines that the processing related to its own output power ports 25 is completed (Yes). Thus, the address setting processing in communication system 100 is completed (step S45).

Thus, in communication system 100, the address setting processing in communication system 100 is completed at the time when master communication device 10 receives "completion notification" from each of all lower-level slave communication devices 11 connected to master communication device 10.

[1-3. Effects and Others]

Thus, in the present exemplary embodiment, the communication system includes a plurality of communication devices, and the communication devices form a hierarchical structure having two or more levels where an upper-level communication device is connected to one or more lower-level communication devices. In this communication system, a communication device connected to lower-level communication devices sequentially applies, to each of the connected lower-level communication devices, an operation of turning on one lower-level communication device and transmitting an address to the turned-on lower-level communication device. The address is set on the basis of the sequence of turning on the lower-level communication devices.

In this communication system, a communication device that is connected to an upper-level communication device and is not connected to a lower-level communication device may perform the processes of:

transmitting "completion notification" to the upper-level communication device, after being turned on by the upper-level communication device and receiving an address transmitted from the upper-level communication device.

In this communication system, a communication device that is connected to an upper-level communication device and is connected to one or more lower-level communication devices may perform the processes of:

performing the operation of turning on one lower-level communication device and transmitting an address to the turned-on lower-level communication device, after being turned on by the upper-level communication device and receiving an address transmitted from the upper-level communication device. Then, the communication device may sequentially apply this operation to each of the connected lower-level communication devices, and may transmit "completion notification" to the upper-level communication device after receiving "completion notification" from each of all the connected lower-level communication devices.

In this communication system, a communication device that is connected to lower-level communication devices may sequentially apply the following operation to each of the connected lower-level communication devices. The operation includes the processes of:

turning on one lower-level communication device and transmitting an address to it;

receiving "completion notification" from the lower-level communication device to which the address is transmitted; and then turning on the next one lower-level communication device and transmitting an address to it.

In this communication system, each of the communication devices may include one or more output power ports for supplying electric power, and each of lower-level communication devices may be connected to each of the output power ports of the upper-level communication device via a power line. The communication device that is connected to lower-level communication devices may turn on each of the lower-level communication devices by supplying electric power to each of the lower-level communication devices through each of the output power ports.

In this communication system, a communication device that is connected to lower-level communication devices may transmit, to each of the lower-level communication devices, an address based on the number (e.g. serial number) of the output power port.

In this communication system, a communication device that is connected to lower-level communication devices may transmit an address to each of the lower-level communication devices via a power line.

In this communication system, a communication device that is connected to an upper-level communication device may transmit "completion notification" to the upper-level communication device via a power line.

In this communication system, the uppermost-level communication device in the hierarchical structure may complete the address setting processing in the communication system by receiving "completion notification" from each of all the lower-level communication devices connected to the uppermost-level communication device.

In this communication system, the uppermost-level communication device may be set as a master communication device, and each of the communication devices other than the uppermost-level communication device may be set as a slave communication device.

In the present exemplary embodiment, the communication device includes one or more output power ports and is configured to allow each of the output power ports to be connected to another communication device. The communication device whose output power ports are connected to lower-level communication devices sequentially applies, to each of the lower-level communication devices connected to the output power ports, an operation of turning on one lower-level communication device and transmitting an address to the turned-on lower-level communication device. The communication device sets the addresses on the basis of the sequence of turning on the lower-level communication devices.

This communication device may include an input power port for receiving the supplied electric power, and may be configured to supply electric power to the outside through an output power port. Then, the communication device may turn on each of the lower-level communication devices connected to the output power ports by supplying electric power through each of the output power ports to the input power port of each of the lower-level communication devices.

This communication device may include power switches disposed between an input power port and each of the output power ports for controlling the electric power supply to the outside through each of the output power ports.

This communication device may transmit an address based on the number (e.g. serial number) of each of the output power ports to each of the lower-level communication devices connected to each of the output power ports.

In the present disclosure, master communication device 10 and slave communication device 11 are examples of communication devices. Communication system 100 is one example of a communication system. Power switch 23 is one example of a power switch. Input power port 24 is one example of an input power port. Output power port 25 is one example of an output power port.

In the conventional technology, the communication system where a plurality of slave communication devices are connected to a master communication device and a network communicating means uses PLC is subject to the following restriction:

when the master communication device initially sets an address to each slave communication device, a system administrator needs to perform an operation of making the master communication device identify each slave communication device.

This operation is to simultaneously press an initial setting button disposed in the master communication device and the initial setting button disposed in the slave communication device, for example. This is because it is difficult that the master communication device identifies each slave communication device in the stage before an address is set to each slave communication device (before initial setting).

In the conventional technology, in the communication system having a hierarchical structure having many levels, for example, in which a plurality of slave communication devices are connected to a master communication device and lower-level slave communication devices are connected to each slave communication device, it is difficult to automatically perform the processing of initially setting an address to each slave communication device. This is because it is difficult that the master communication device recognizes how slave communication devices are connected to each other (namely, network topology).

In the communication system of the present disclosure, however, as shown in one example of the above-mentioned exemplary embodiment, an upper-level communication device can identify lower-level communication devices connected to the upper-level communication device by sequentially turning on the lower-level communication devices. Furthermore, the upper-level communication device can automatically set an address corresponding to the hierarchical structure to each lower-level communication device by setting the address on the basis of the turning-on sequence. Therefore, in the communication system formed of the communication devices of the present disclosure, the upper-level communication device can appropriately set an address to each lower-level communication device. Therefore, even in a hierarchical structure having many levels, an address can be automatically and appropriately set to each communication device.

Other Exemplary Embodiments

Thus, the first exemplary embodiment has been described as an example of a technology disclosed in the present application. However, the disclosed technology is not limited to the exemplary embodiment. The disclosed technology can be also applied to the exemplary embodiment having undergone change, replacement, addition, or omission. A new exemplary embodiment may be created by combining the components described in the first exemplary embodiment.

Other exemplary embodiments are described hereinafter.

In the first exemplary embodiment, FIG. 1 shows the example where communication system 100 has a hierarchical structure having three levels. However, the communication system of the present disclosure is not limited to the hierarchical structure shown in FIG. 1. The hierarchical structure of the communication system may have two levels, or may have four or more levels. Alternatively, a communication system may be configured to have hierarchical structures having different number of levels. For example, a hierarchical structure having two levels is formed under a certain slave communication device, and a hierarchical structure having four levels is formed under another slave communication device.

The first exemplary embodiment has described the configuration example where communication system 100 includes seven slave communication devices 11. However, the number of communication devices included in the communication system of the present exposure is not limited to seven. The communication system may be formed of eight or more slave communication devices, or may be formed of less than seven slave communication devices.

The first exemplary embodiment has described the configuration example where PLC is used as a communicating means between communication devices. However, the communicating means in the communication system of the present disclosure is not limited to PLC. For example, the transmission/reception of address information and "completion notification" between an upper-level communication device and a lower-level communication device may be performed by radio communication or wire communication using a signal line dedicated to communication. Even such a configuration can produce an advantage similar to the above-mentioned one.

The first exemplary embodiment has described the configuration example where a lower-level communication device is turned on by the electric power supply from an upper-level communication device to the lower-level communication device. However, the communication system of the present disclosure is not limited to this configuration. For example, the communication system may have the following configuration:

each communication device is connected to main power source, or each communication device has a power source such as a secondary battery; and the upper-level communication device turns on the lower-level communication device by controlling the power switch of the lower-level communication device.

Alternatively, the communication system may have the following configuration:

each communication device is connected to each power source; and the upper-level communication device commands each power source to supply the electric power to control the power source of the lower-level communication device.

Even such a configuration can produce an advantage similar to the above-mentioned one.

The first exemplary embodiment has described the operation example where an address is set on the basis of the serial number of an output power port. However, the communication system of the present disclosure is not limited to this operation example. The operation example described in the first exemplary embodiment is solely one example of the association between the turning-on sequence and the addresses. For example, an address may be calculated by substituting the serial number of an output power port into a predetermined calculation equation. As one example, an IP (Internet Protocol) address is used as an address. When the number of output power ports included in one communication device is 16 or less, an address may be calculated by setting calculation equation "192. 168. (the serial number of an output power port at the first level*16+the serial number of an output power port at the second level). (the serial number of an output power port at the third level*16+the serial number of an output power port at the fourth level)". In this case, address "192. 168. 18. 52" can be calculated and set to a communication device at the fifth level when the serial numbers of output power ports at the first to fourth levels are 1, 2, 3, and 4. Even such a configuration can produce an advantage similar to the above-mentioned one.

In the communication system of the present exemplary embodiment, a failure of a slave communication device or a disconnection of a power line can be detected. For example, the case is considered in which, though an output power port is valid, "completion notification" is not transmitted, within a predetermined period, from the lower-level slave communication device connected to the output power port. In this case, the upper-level communication device can determine that the lower-level slave communication device fails or the power line between the upper-level communication device and the lower-level slave communication device is disconnected. At this time, the upper-level communication device may set, to the next lower-level slave communication device, a normal address or the address to be set to the slave communication device in which the abnormality has been detected.

The first exemplary embodiment has described the operation example where an upper-level communication device outputs electric power through output power ports in ascending sequence of the serial numbers of the output power ports. However, the present disclosure is not limited to this configuration. For example, an upper-level communication device may output electric power through output power ports in descending sequence of the serial numbers of the output power ports. Alternatively, the upper-level communication device may sequentially output electric power through the output power ports having even serial numbers at first, and may sequentially output electric power through the output power ports having odd serial numbers next.

"Completion notification" may include address information set to the slave communication device that transmits "completion notification".

Each address shown in the exemplary embodiments is solely one example. Preferably, each address is appropriately set in accordance with the network configuration or the specification of the communication system.

The number of output power ports included in a communication device may be one, or four or more.

The present disclosure is applicable to a communication system formed by hierarchically interconnecting a plurality of communication devices, and to the communication devices included in the communication system.

What is claimed is:

1. A communication system comprising a plurality of communication devices,
the plurality of communication devices forming a hierarchical structure having two or more levels where an upper-level communication device of the plurality of communication devices is directly connected to at least two lower-level communication devices of the plurality of communication devices,
wherein the upper-level communication device directly connected to the at least two lower-level communication devices
turns on one of the at least two lower-level communication devices,
transmits an address to the turned-on one of the at least two lower-level communication devices before turning on a next one of the at least two lower-level communication devices, and
sets the address based on a sequence of turning on the at least two lower-level communication devices, and
wherein at least one of the at least two lower-level communication devices is connected to at least one even lower-level communication device, the at least one of the at least two lower-level communication devices connected to the at least one of the even lower-level communication device
performs an operation of turning on the at least one of the even lower-level communication device and transmitting an address to the turned-on one of the at least one of the even lower-level communication device, after being turned on by the upper-level communication device and receiving an address transmitted from the upper-level communication device,
sequentially applies the operation to each of the at least one of the even lower-level communication device, and
transmits a completion notification to the upper-level communication device after receiving a completion notification from each of the at least one of the even lower-level communication device.

2. The communication system according to claim 1, wherein
at least one of the at least two lower-level communication devices is not connected to an even lower-level communication device, and
the at least one of the at least two lower-level communication devices that is not connected to an even lower-level communication device transmits a completion notification to the upper-level communication device after being turned on by the upper-level communication device and receiving an address transmitted from the upper-level communication device.

3. The communication system according to claim 1, wherein
the upper level communication device
turns on the one of the at least two lower-level communication devices, and transmits the address to the turned-on one of the at least two lower-level communication devices,
receives the completion notification from the turned-on one of the at least two lower-level communication devices to which the address has been transmitted, and
after receiving the completion notification from the turned-on one of the at least two lower-level communication devices, turns on the next one of the at least two lower-level communication devices, and transmits an address to the next one of the at least two lower-level communication devices.

4. The communication system according to claim 1, wherein each of the plurality of communication devices includes one or more output power ports for supplying electric power, the upper-level communication device includes at least two of the output power ports, each of the at least two lower-level communication devices is directly connected to a respective one of the at least two output power ports of the upper-level communication device via a power line, and the upper-level communication device turns on each of the at least two lower-level communication devices by supplying electric power to each of the at least two lower-level communication devices through the at least two output power ports.

5. The communication system according to claim 4, wherein
the upper-level communication device directly connected to the at least two lower-level communication devices transmits an address to each of the at least two lower-level communication devices, the address of each of the at least two lower-level communication devices being based on a number of a one of the at least two output power ports to which the lower-level communication device is connected.

6. The communication system according to claim 4, wherein
the upper-level communication device directly connected to the at least two lower-level communication devices transmits an address to each of the at least two lower-level communication devices via the power lines.

7. The communication system according to claim 4, wherein
each of the at least two lower-level communication devices transmits a completion notification to the upper-level communication device via the power lines.

8. The communication system according to claim 1, wherein
after the upper-level communication device of the plurality of communication devices in the hierarchical structure receives a completion notification from each of the at least two lower-level communication devices, address setting processing in the communication system is completed.

9. The communication system according to claim 8, wherein
the upper-level communication device is set as a master communication device, and
each of the plurality of communication devices except the upper-level communication device is set as a slave communication device.

10. A communication device comprising at least two output power ports each directly connected to a lower-level communication device,
wherein the communication device having the at least two output power ports directly connected to the at least two lower-level communication devices is operable to turn on one of the at least two lower-level communication devices,
transmit an address to the turned-on one of the at least two lower-level communication devices before turning on a next one of the at least two lower-level communication devices,
set the address based on a sequence of turning on the at least two lower-level communication devices,
receive a completion notification from the turned-on one of the at least two lower-level communication devices to which the address has been transmitted,
after receiving the completion notification from the turned-on one of the at least two lower-level communication devices, turns on the next one of the at least two lower-level communication devices, and
transmits an address to the next one of the at least two lower-level communication devices, wherein the communication device is connected to an upper-level communication device, and wherein the communication device transmits a completion notification to the upper-level communication device after receiving the completion notification from each of the at least two lower-level communication devices.

11. The communication device according to claim 10, wherein
the communication device is operable to be turned on by the upper-level communication device, receive an address transmitted from the upper-level communication device, and, after receiving the address, transmit a completion notification to the upper-level communication device.

12. The communication device according to claim 10, further comprising
an input power port for receiving supplied electric power, the communication device being configured to supply electric power through the at least two output power ports, wherein
the communication device is operable to turn on each of the at least two lower-level communication devices by supplying, through each of the at least two output power ports, electric power to an input power port of each of the at least two lower-level communication devices connected to each of the at least two output power ports.

13. The communication device according to claim 12, further comprising
power switches disposed between the input power port and each of the at least two output power ports for controlling electric power supply through each of the at least two output power ports.

14. The communication device according to claim 12, wherein
the communication device is operable to transmit an address to each of the at least two lower-level communication devices connected to the at least two output power ports, the address of each of the at least two lower-level communication devices being based on a number of a one of the output power ports to which the lower-level communication device is connected.

15. The communication device according to claim 12, wherein
the communication device is operable to transmit, via power lines, an address to each of the at least two lower-level communication devices connected to the at least two output power ports via the power lines.

16. The communication device according to claim 12, wherein
the communication device is operable to transmit, via a power line, a completion notification to an upper-level communication device connected to the input power port via the power line.

17. An address setting method in a communication system including a plurality of communication devices, the plurality of communication devices forming a hierarchical structure having two or more levels where an upper-level communication device of the plurality of communication devices is directly connected to at least two lower-level communication devices of the plurality of communication devices, the address setting method comprising:
- turning on, with the upper-level communication device, a first of the at least two lower-level communication devices directly connected to the upper-level communication device;
- transmitting, with the upper-level communication device, an address to the turned-on first of the at least two lower-level communication devices before turning on a second of the at least two lower-level communication devices;
- setting, with the upper-level communication device, the address based on a sequence of turning on the at least two lower-level communication devices;
- after receiving a completion notification from the first of the at least two lower-level communication devices, turning on, with the upper-level communication device, the second of the at least two lower-level communication devices directly connected to the upper-level communication device;
- transmitting, with the upper-level communication device, an address to the turned-on second of the at least two lower-level communication devices;
- receiving, with the upper-level communication device, a completion notification from the second of the at least two lower-level communication devices, one of the first and second of the at least two lower-level communication devices not being connected to an even lower level communication device and another of the first and second of the at least two lower-level communication devices being connected to at least one even lower-level communication device;
- transmitting, with the one of the first and second of the at least two lower-level communication devices that is not connected to an even lower-level communication device and that has received the address, the completion notification to the upper-level communication device;
- performing, with the other one of the first and second of the at least two lower-level communication devices that is connected to the at least one even lower-level communication device and that has received the address, an operation of turning on one of the at least one even lower-level communication device and transmitting an address to the turned-on one of the at least one even lower-level communication device; and
- sequentially applying, with the other one of the first and second of the at least two lower-level communication devices that is connected to the at least one even lower-level communication device, the operation to each of the at least one even lower-level communication device, and transmitting the completion notification to the upper-level communication device after receiving a completion notification from each of the at least one even lower-level communication device, wherein
- after an uppermost-level communication device of the plurality of communication devices in the hierarchical structure receives a completion notification from all lower-level communication devices connected to the uppermost-level communication device, address setting processing in the communication system is completed.

* * * * *